June 12, 1962    R. M. WILMOTTE    3,039,004
ELECTRO-OPTICAL CONDITION SENSING AND CORRECTING CIRCUITS
Filed Dec. 31, 1959    2 Sheets-Sheet 1
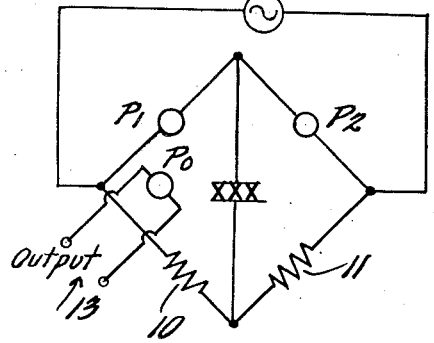
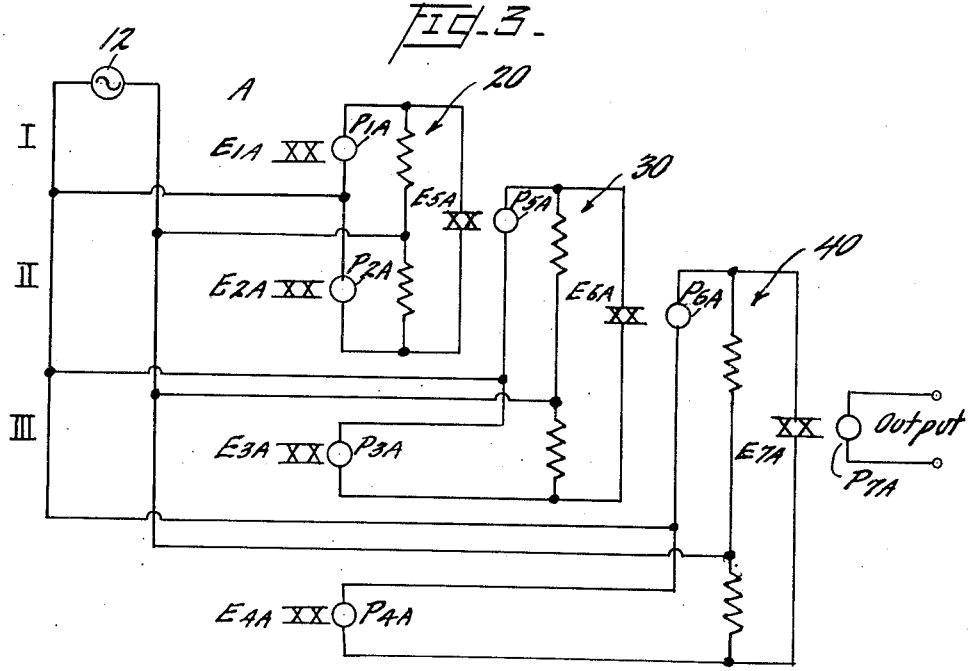
INVENTOR
Raymond M. Wilmotte,
BY Paris, Haskell & Levine
ATTORNEYS

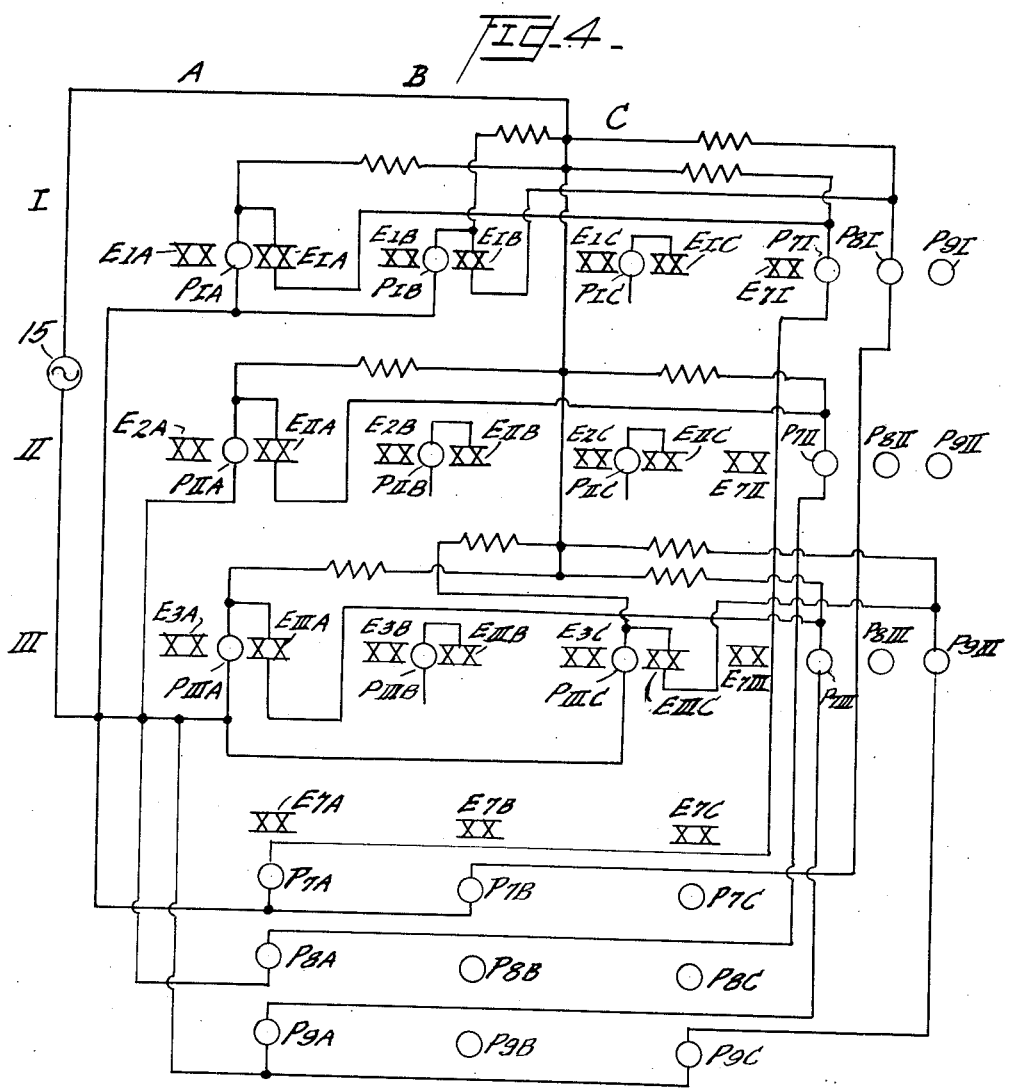

United States Patent Office 3,039,004
Patented June 12, 1962

3,039,004
ELECTRO-OPTICAL CONDITION SENSING AND CORRECTING CIRCUITS
Raymond M. Wilmotte, 68 Mountain Ave., Princeton, N.J.
Filed Dec. 31, 1959, Ser. No. 863,204
5 Claims. (Cl. 250—210)

The present invention relates to the field of electro-optical data processing, and is particularly directed to exclusive "or" circuits adapted to sense the presence of an odd or even number of bits in a unit of intelligence in a multi-bit code, and the invention is further directed to sensing an error in a binary multi-bit code unit of intelligence, and to correcting such error.

In particular, the present invention is directed to circuits of the foregoing character utilizing voltage responsive light sources and photoresponsive elements electrically and optically coupled in circuit relation to perform the foregoing functions. Because of the conveniences and advantages of solid state devices, it is contemplated that in their preferred forms the voltage responsive light sources be electroluminescent cells, and the photoresponsive elements be photoconductors.

Electroluminescent cells are well known and are generally analogous to capacitors. They may comprise a phosphor material such as zinc sulfide, which possesses the property of luminescing when exposed to a varying electrical field in excess of a threshold voltage and frequency for the particular cell. The phosphor material may be dispersed and embedded in a dielectric vehicle such as a plastic sheet, which in turn is sandwiched between two conductive electrode layers to which the electrical field generating signal is applied. In order to facilitate light emission from the cell, the dielectric vehicle and at least one of the electrode layers is usually made transparent. Photoconductors are also well known, and these may be in the form of cadmium sulfide crystals.

The basic component of the circuits of the present invention comprises an electro-optical Wheatstone bridge network, having photoresponsive elements in each of two arms of the bridge, and a voltage responsive light source connected across the output of the bridge. The impedances of the bridge are chosen so that they are balanced and no output is obtained when neither photoresponsive element is illuminated. It is also balanced when both photoresponsive elements are equally illuminated. However, if either one or the other of the photoresponsive elements is illuminated, and hence reduced in impedance, while the other is not illuminated, the bridge is thereby unbalanced to provide an output developing a luminance of the output light source. Accordingly, by way of elementary illustration of operation of this bridge network, if an input light source is optically coupled with each of the bridge photoconductors, the bridge output light source becomes luminant if either one of the input light sources is luminant while the other is non-luminant. However, if both input sources are luminant, or both are non-luminant, the bridge is in a balanced state and its output light source is non-luminant. Thus, the bridge circuit operates to indicate whether the input light sources are in an even state (both luminant or both non-luminant), or are in an odd state (one luminant and the other non-luminant). As set forth in the detailed description of the invention hereinbelow, this basic exclusive "or" network can be utilized in a cascade arrangement of such networks to ascertain whether a unit of multi-bit intelligence contains an even or odd number of bits. Accordingly if the intelligence is always encoded, by the use of a redundancy pulse in the code, to provide an even or an odd number of bits per unit, the presence of an error in the received intelligence unit can be detected by used of the network of the present invention. Further, as will also be explained in detail hereinafter, once having detected the presence of an error, the present invention further contemplates locating this error, and correcting it.

It is accordingly one object of the present invention to provide an electro-optical exclusive "or" network.

Another object of the present invention is to provide such a network in the form of a bridge circuit.

Another object of the present invention is to provide such a network employing electroluminescent cells and photoconductors.

Still another object of the present invention is to provide a plurality of such networks in cascade relation for effecting an exclusive "or" determination of the condition of a plurality of binary indicators.

And a still further object of the present invention is to provide such an exclusive "or" determination of the condition of a plurality of binary indicators, and further to provide for correcting the binary indicators when in error to accord with a predetermined overall pattern of binary encoding and presentation of intelligence.

Other objects and advantages of the present invention will become apparent to those skilled in the art from a consideration of the following detailed description of exemplary embodiments of the present invention had in conjunction with the accompanying drawings, in which like numerals or indicia refer to like or corresponding parts, and wherein:

FIG. 1 is a diagrammatic showing of a pattern of intelligence presentation;

FIG. 2 is a schematic wiring diagram of one bridge circuit of the present invention;

FIG. 3 is a schematic wiring diagram of a plurality of cascaded bridge circuits of FIG. 2 arranged to check for errors in a column of intelligence presentation as set out in FIG. 1; and FIG. 4 is a schematic wiring diagram of a circuit adapted to be combined with that of FIG. 3, for correcting any errors detected by the FIG. 3 circuit.

For the purpose of illustrating the present invention, one mode of intelligence presentation is suggested in FIG. 1, constituting a code of nine binary digits or bits arranged in three ranks I, II, and III, and in three columns A, B, and C. The nine potential digits or bits are represented by X's, while each rank and each column has provision for a redundant binary digit represented by 0's. The intelligence coding pattern is chosen so that when a unit of intelligence is properly represented by the nine binary X bits, with the selected use of the redundant 0 bits, there is always either an even (or an odd, if desired) number of positive digits present in each of the columns and each of the ranks. Thus, by determining whether the total number of positive digits or bits in each column and each rank is odd or even, by means to be subsequently described, one can ascertain whether the intelligence presentation possesses an error, and if so, which of the nine bits is in error, and further, such error can be corrected. For the purpose of subsequent illustration, it will be assumed that the coding pattern requires an even number of positive bits for each column and rank, although it will be apparent that the system can be designed to operate on an odd number basis, if desired.

Referring next to FIG. 2, the basic unit employed in the present invention is there illustrated. It comprises a Wheatstone bridge network having photoconductor P1 in one arm, photoconductor P2 in a second arm, and resistors 10 and 11 in the third and fourth arms. The bridge is energized in conventional fashion by voltage source 12, with an output applied across an electroluminescent cell E. Thus, cell E provides an optical output for the bridge. If photoconductors P1 and P2 are either both illuminated (by means to be subsequently described), or both not illuminated, the bridge is essentially balanced, and output cell E is non-luminant. However, if either one of the cells P1 or P2 is illuminated while the other is non-luminant, then the illuminated photoconductor will have an impedance substantially less than the other photoconductor, resulting in a substantial unbalance of the bridge, and resultant luminance of the cell E. To convert the optical output of cell E to an electrical output, a third photoconductor P0 is optically coupled with the cell E to change the impedance in an output circuit 13, and thus provide an electrical output in accordance with the optical output of cell E.

In FIG. 3, the bridge circuit of FIG. 2, is illustrated as applied in cascade fashion to column A of FIG. 1, for the purpose of ascertaining whether at any particular instant there is an even or an odd number of positive bits in this column. Column A is in this embodiment represented by four electroluminescent cells E1A in rank I, E2A in rank II, E3A in rank III, and the redundancy digit cell E4A. A first bridge 20 comprises the photoconductor P1A optically coupled to cell E1A, and a second photoconductor P2A optically coupled to cell E2A. From the foregoing explanation of FIG. 2, it is apparent that if cells E1A and E2A are either both luminant or both non-luminant, the output cell E5A of bridge 20 is non-luminant. However, if only one of these cells, E1A or E2A, is luminant, then output cell E5A is rendered luminant.

Output cell E5A is optically coupled with photoconductor P5A, which photoconductor comprises one arm of the bridge 30. In the opposite arm, bridge 30 has photoconductor P3A optically coupled with cell E3A. Again, the optical output of bridge 30 through output cell E6A is determined by the illuminated condition of photoconductors P5A and P3A, as previously explained.

Similarly bridge 40 comprises a first photoconductor P6A optically coupled with the output cell E6A of bridge 30, and a second photoconductor P4A optically coupled with cell E4A. The output cell E7A is likewise controlled by the relative conditions of illumination of photoconductors P6A and P4A.

With the foregoing cascade arrangement of bridges, each similar to the bridge of FIG. 2, it will be readily apparent that regardless of what the combination, if an even number of cells E1A–E4A are luminant, representing an even number of positive bits or digits in column A, output cell E7A is non-luminant. Similarly, if an odd number of cells E1A–E4A are luminant, regardless of which combination of cells, output cell E7A will be luminant. Output cell E7A may be optically coupled with photoconductor P7A to provide an electrical output for the cascaded bridge networks 20, 30, and 40.

It is apparent that a corresponding cascade of bridge networks can be provided for each of the other columns B and C, as well as for each of the ranks I, II, and III, thereby providing an indication of whether the positive digits in any column or rank read odd or even. If the encoding of the intelligence unit is chosen always to provide an even number of positive digits for each column and rank, it will be readily appreciated that any error in the coded display of FIG. 1 will become immediately apparent from the output cell E7A, or its corresponding cell for each of the corresponding cascades of bridge networks. Also, if one digit is in error, it is apparent that that error will appear both in the column array of which that digit is a part, as well as the rank array thereof. Thus, by the intersection of the column and rank, the specific digit in error becomes apparent, and the error is easily corrected by reversing the state of that specific digit.

A circuit for correcting the specific digit in error is illustrated in FIG. 4, specifically for correcting an error in column A. The remainder of the nine digit readout and correction system is only partially illustrated, it being apparent that the system can be readily expanded by analogy to column A to cover columns B and C.

Column A in FIG. 4 comprises the digit cells E1A, E2A, and E3A, each of which is optically coupled to a respective photoconductor PIA, PIIA, and PIIIA. Each of these photoconductors is one arm of a bridge circuit energized by voltage source 15. The bridge circuit for PIA has in an opposite arm the series photoconductors P7A and P7I. The bridge circuit for PIIA has in an opposite arm the series photoconductors P8A and P7II. The bridge circuit for PIIIA has in an opposite arm the series photoconductors P9A and P7III. The output of the first mentioned bridge is applied across cell EIA, while that for the second mentioned bridge is applied across cell EIIA, and for the third mentioned bridge, across cell EIIIA. Cells EIA, EIIA, and EIIIA are optically coupled with the photoconductors PIA, PIIA, and PIIIA. Cell E7A is the cascaded bridge circuit output as illustrated in FIG. 3, which cascaded bridge circuit would be associated with cells E1A, E2A, E3A, and E4A, but is omitted from FIG. 4 for clarity. Cell E7A is optically coupled to photoconductors P7A, P8A, and P9A. Cell E7I is similarly the cascaded bridge circuit output that would be associated with cells E1A, E1B, E1C, and E1D (the redundancy cell—not shown). This cell E7A is optically coupled with photoconductors P7I, P8I, and P9I. Similarly, cascade error detecting circuits would be provided for the cells of columns B and C, and for the cells of ranks II and III, each provided with its respective E7 output stage in turn optically coupled to its respective indicated group of three P7, P8, and P9 photoconductors.

Luminance of any of the digit cells E1A, E2A, or E3A reduces the impedance of the respective photoconductor PIA, PIIA, or PIIIA, tending to produce an unbalance in the bridge of which these photoconductors are respectively a part, thereby tending to cause the corresponding bridge output cell EIA, EIIA, or EIIIA to luminesce. If an even number of digit cells in column A, including the redundancy cell (not shown in FIG. 4), are lit, the displayed information is correct, and cell E7A is not caused to luminesce. Therefore the luminescing cells EIA, EIIA, and/or EIIIA do luminesce as a result of the unbalance in their respective energizing bridges. These bridges are retained in an unbalanced state through continued illumination of the respective photoconductors PIA, PIIA, and PIIIA by their respective cells EIA, EIIA, and EIIIA.

However, if one of the digit cells in column A is in error, an odd number of column A digit cells will be lit, and cell E7A will be caused to luminesce. It is apparent that this error must also appear in the corresponding rank I, II, or III. For example, if the error is in cell E1A, then the error also appears as an odd number of positive bits or digits in rank I. Therefore error detecting output cell E7I is caused to luminesce. With both cells E7A and E7I luminescing, the bridge circuit arm comprising the series photoconductors P7A and P7I is reduced to a low impedance, thereby altering the state of the bridge whose output is applied across cell EIA. Cell EIA is thus caused to switch states, and the output of column A as read from cells EIA, EIIA, and EIIIA has been rendered correct. Since the bridge associated with cell EIA is the only one in whose series photoconductor arm both photoconductors are illuminated, it is the only cell whose state is caused to be switched.

The correction bridge circuits for all the ranks of column A have been fully illustrated in FIG. 4. In addition, the correction bridge circuits for column B, rank I and column C, rank III have been fully illustrated in FIG. 4. By analogy, the remainder of the correction circuits for each of the other four digit positions can be readily completed. The existence of of a correction bridge circuit for each of these other four digits would include the elements as tabulated below:

Position B–II: PIIB, EIIB, P8B, P8II
Position B–III: PIIIB, EIIIB, P9B, P8III
Position C–I: PIC, EIC, P7C, P9I
Position C–II: PIIC, EIIC, P8C, P9II From the foregoing detailed description of the present invention, it will be appreciated that there is provided an electro-optical bridge circuit, and particularly a cascade arrangement of such bridge circuits for determining whether an array or binary light sources is displaying an even or odd number of positive states. In addition, such an electro-optical bridge circuit is employed to change the state of a binary light source found to be in error with respect to a predetermined condition imposed upon the array. It is understood that the foregoing detailed description is presented merely by way of example, and it is not intended that the invention be construed as limited thereto, since such variations and modifications of the description as are embraced by the spirit and scope of the appended claims are contemplated as within the purview of this invention.

What is claimed is:

1. An exclusive "or" circuit comprising: a plurality of cascaded electro-optical bridge circuits; each bridge circuit having photoresponsive means in each of two opposite sides thereof so that the bridge may be changed between a substantially balanced and an unbalanced state by variation in the relative impedances of said photoresponsive means, and a voltage responsive light source in the bridge output circuit, whereby the output of the bridge as determined by the light state of the output circuit light source indicates whether said input light sources are in the same or different states; and a plurality of input light sources; a first and second of said input light sources being optically coupled respectively to each photoresponsive means of a first of said bridge circuits; a third of said input light sources being optically coupled to one photoresponsive means of a second of said bridge circuits; and the output circuit light source of said first bridge circuit being optically coupled to the other photoresponsive means of said second bridge circuit; whereby the luminance state of the output circuit light source of said second circuit indicates whether an even or an odd number of the stated three input light sources are luminant.

2. An exclusive "or" circuit as set forth in claim 1, wherein said photoresponsive means are photoconductors and said voltage responsive light sources are electroluminescent cells.

3. An error detecting and correcting circuit comprising: a plurality of input light sources having a luminant and a non-luminant state, said sources being arranged in a matrix of rows comprising columns and ranks, the light sources of each row having a first condition in which an even number of sources are luminant and a second condition in which an odd number of sources are luminant, said light sources being adapted to be illuminated in accordance with an intelligence code programmed to cause each one of said rows to obtain a predetermined one of said conditions; an exclusive "or" circuit associated with each of said rows providing an optical output indicative of which of said conditions is obtained in its associated row; additional circuit means associated with each of said input light sources including a secondary light source, means responsive to the luminance state of the respective input light source for causing said secondary light source to obtain a luminance state corresponding to that of said respective input light source, photoresponsive means optically coupled to the output of the exclusive "or" circuits of both the column and rank of said respective input light source to change the state of said secondary light source only when the outputs of both last-mentioned exclusive "or" circuits indicate the conditions obtained in both the rank and column associated therewith are other than said predetermined one of said two conditions; whereby the optical output of said matrix as read from the luminance states of said secondary light sources is corrected for any error that may appear in the input light sources.

4. An error detecting and correcting circuit as set forth in claim 3, wherein each said exclusive "or" circuit comprises: a plurality of cascaded electro-optical bridge circuits; each bridge circuit having photoresponsive means in each of two opposite sides thereof so that the bridge may be changed between a substantially balanced and an unbalanced state by variation in the relative impedances of said photoresponsive means, and a voltage responsive light source in the bridge output circuit, whereby the output of the bridge as determined by the light state of the output circuit light source indicates whether said input light sources are in the same or different states; a first and second of said input light sources of a given row being optically coupled respectively to each photoresponsive means of a first of said bridge circuits; each of the other input light sources of said given row being optically coupled to a respective one of the photoresponsive means of other respective bridge circuits; and the output circuit light source of each of the other bridge circuits except one being optically coupled to the other photoresponsive means of respective bridge circuits; the output circuit light source of said one bridge circuit constituting said optical output of the exclusive "or" circuit.

5. An error detecting and correcting circuit as set forth in claim 4, wherein all photoresponsive means are photoconductors and all said secondary light sources and voltage responsive light sources are electroluminescent cells.

References Cited in the file of this patent

UNITED STATES PATENTS 2,304,191    Mott-Smith _____ Dec. 8, 1942

OTHER REFERENCES

Mellon Institute of Industrial Research Quarterly Report No. 3, second series of the Computer Components Fellowship No. 347. Date of publication Aug. 2, 1954.